March 26, 1929.  R. DUBUSC  1,707,079
SYSTEM FOR MEASURING ELECTRICAL QUANTITIES
Filed May 12, 1927  3 Sheets-Sheet 2
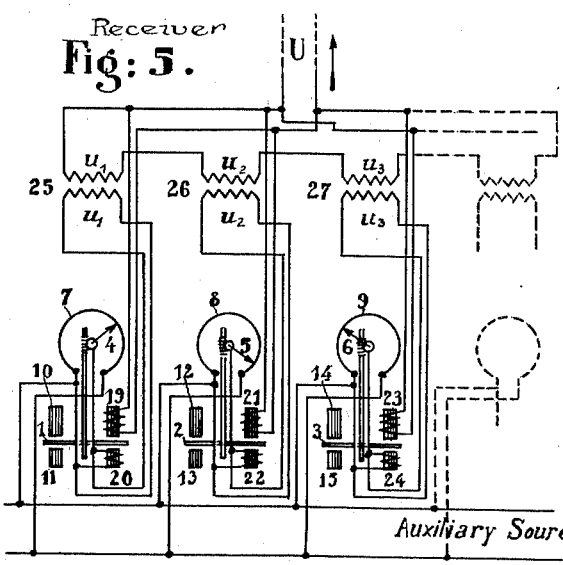
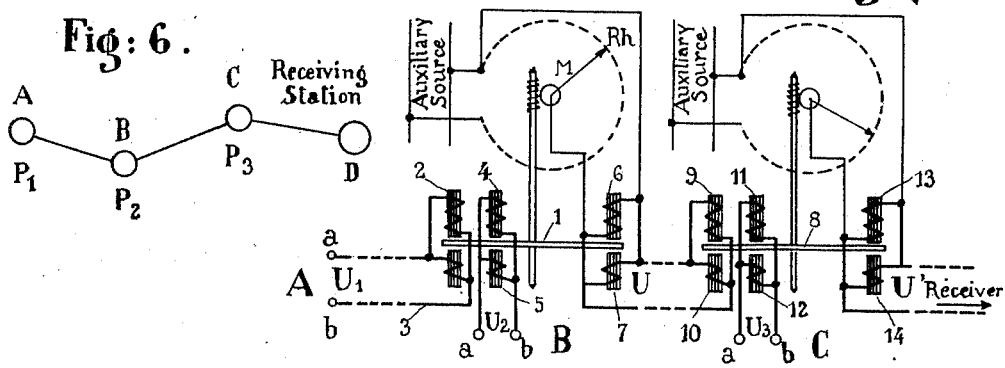
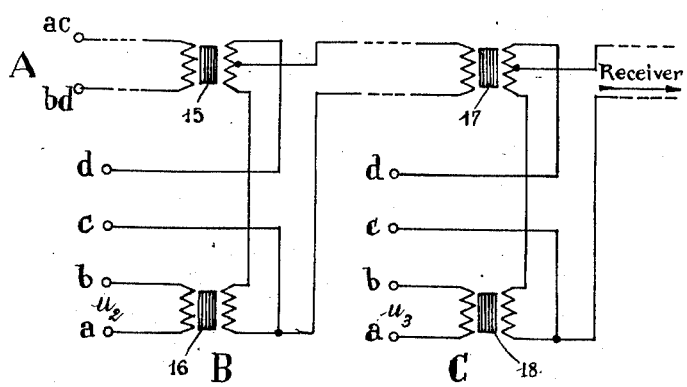
Inventor
Roger Dubusc
by Wilkinson & Giusta
Attorneys.

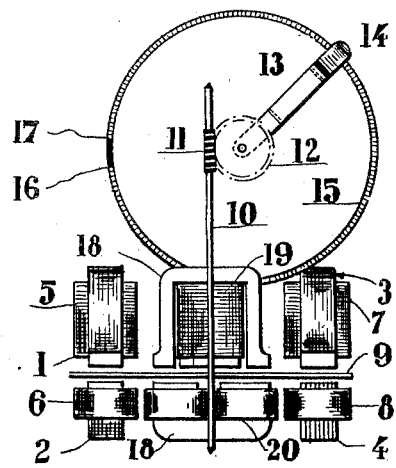
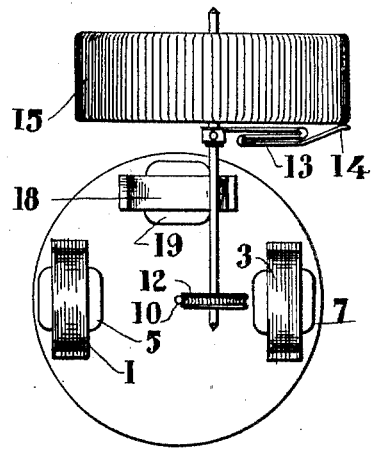
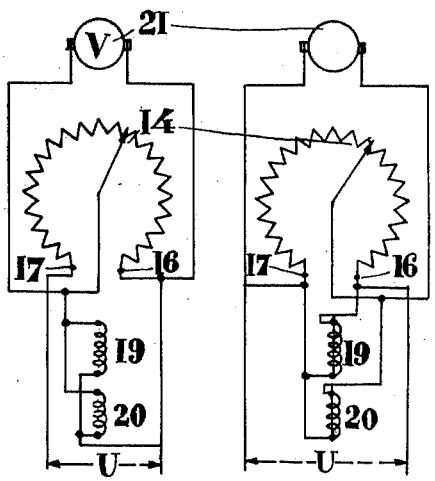

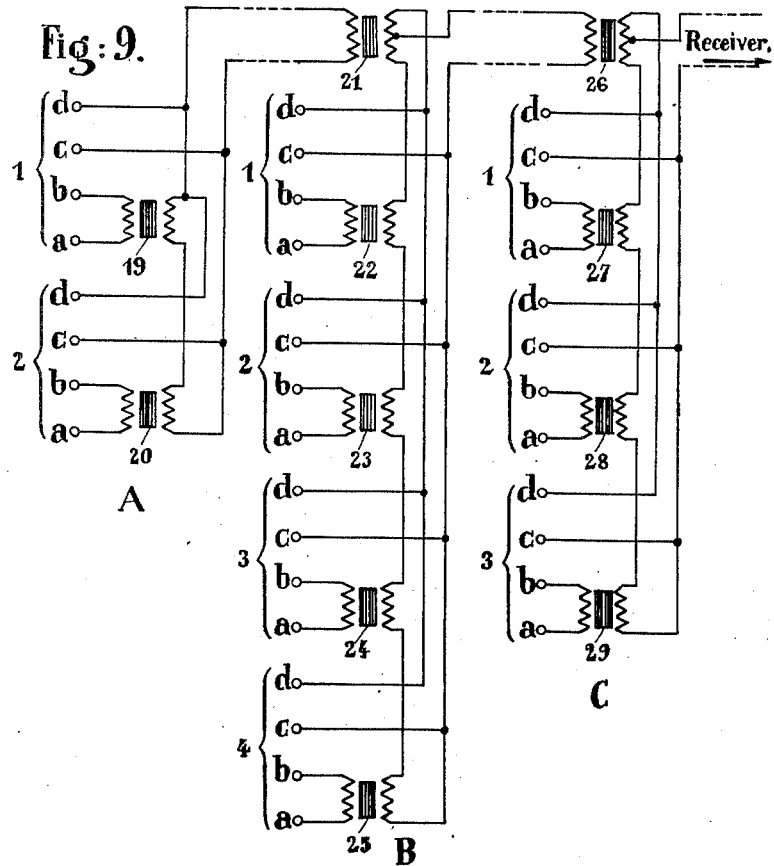

Patented Mar. 26, 1929.

1,707,079

UNITED STATES PATENT OFFICE.

ROGER DUBUSC, OF PARIS, FRANCE, ASSIGNOR TO COMPAGNIE POUR LA FABRICATION DES COMPTEURS ET MATÉRIEL D'USINES À GAZ, OF MONTROUGE, FRANCE, A JOINT-STOCK COMPANY OF FRANCE.

SYSTEM FOR MEASURING ELECTRICAL QUANTITIES.

Application filed May 12, 1927, Serial No. 190,907, and in France May 20, 1926.

The present invention relates to apparatus for transmitting and totalizing measures of electrical quantities of different circuits.

According to the invention, measures of any electrical quantity or quantities are transmitted from a circuit or circuits at one station to the next following of a group of stations in such manner that at each station in turn measures of the electrical quantities of its circuit or circuits are added to those of the preceding stations, this cumulative summation being finally received at the end station of the group which forms the receiving station.

The electrical quantities of the circuits at the various stations are transmitted by suitable apparatus in the form of voltages proportional to these quantities or to their square roots, and, for a complete understanding of the invention, it will be necessary to describe a suitable type of apparatus for carrying this into effect, it being of course understood that no claim is made to this apparatus per se, which is described in detail in French Patent No. 600035 dated the 24th June 1925 and in patent of addition thereto No. 31339 dated the 23rd December 1925.

On the accompanying drawings:

Figs. 1 and 2 show the known apparatus in question.

Figs. 3, 4 and 5 show different wiring diagrams used in conjunction with Figs. 1 and 2.

Fig. 6 shows a group of stations equipped with the apparatus according to the invention.

Figs. 7, 8 and 9 show circuit arrangements used in conjunction with the stations of Fig. 6.

In the known apparatus shown in Figs. 1 to 4 inclusive, it is assumed that the electrical quantity to be measured is the power. Two electro-magnets 1, 2 and 3, 4 having windings 5, 6 and 7, 8 respectively exert on a disc 9 a torque which is proportional to the power to be measured. The disc 9 is mounted on a shaft 10 having a screwed portion 11 which gears with a toothed wheel 12 which on rotating causes one end 14 of an arm 13 to travel over a circular rheostat 15, the other end of said arm 13 being rigidly secured to the wheel 12. The ends of the rheostat 15 are shunted across a source of electricity of voltage $U$ say.

An electro-magnet 18 having two windings 19 and 20 fed in parallel from the potential difference of the rheostat produces a torque which opposes that exerted on the disc 9 by the watt metric electro-magnets 1, 2 and 3, 4. After the arm 14 has travelled a certain distance over the rheostat 15 the torque exerted by the windings of the electro-magnet 18 will exactly balance that exerted by the windings of the electro-magnets 1, 2 and 3, 4 and the disc 9 will cease rotating.

Now if $u$ is the potential difference between the points 14 and 16 when the opposing torques are in equilibrium, the counteracting torque produced by the coils 19 and 20 of the electro-magnet 18 will be proportional to $u^2$. Also since matters have been arranged so that the torque produced by the electro-magnets 1, 2 and 3, 4 is proportional to the power to be measured it obviously follows that $u^2$ is proportional to the power since the torques balance. In other words the above described apparatus gives a voltage the square of which is proportional to the power of a circuit to be measured.

It will be readily understood that by means of several such rheostats fed from an auxiliary source the summation total of the powers of various circuits could be obtained in the form of the square of a voltage.

Furthermore if the winding 19 is connected across the ends 17, 16 of the rheostat 15 as shown in Fig. 4 the torque proportional to the power is now $u\,U$ and since $U$ is constant the voltage $u$ is proportional to the power.

This method requires however that the voltage of the auxiliary source feeding the rheostat be constant, and Fig. 5 shows a different arrangement whereby alternating current may be used for the auxiliary source. Furthermore a slight modification is introduced in connection with the method of mounting the coils of the counter-balancing electro-magnet. As may be seen from Fig. 5, the coils 20, 22 and 24 are shunted across the partial potential difference obtained by the rotating arm of each of the rheostats, these latter all being fed from an auxiliary source of alternating current.

The other windings 19, 21, 23 are each shunted across the summation total of these partial potential differences. The electromagnets 10—11, 12—13, 14—15 are fed as previously so as to give torques proportional to the power to be transmitted.

If we consider $n$ transmitters and if $u_1, u_2, u_3 \ldots u_n$ are the instantaneous values of the partial potential differences obtained by means of the traveling arms 4, 5, 6 . . .

$$K(P_1+P_2+ \ldots P_n) = \frac{1}{T}\int_0^T (u_1+u_2+ \ldots u_n)^2 dt = U^2$$

in other words, the square of the sum of the partial voltages which can be transmitted to a receiving station is a measure of the sum of the powers. This sum $(u_1+u_2+ \ldots u_n)$ is obtained by means of the transformers 25, 26, 27 and there are as many of these as there are stations.

So far only the power of a direct current system has been considered but the useful power, wattless power and apparent power of a circuit might also be transmitted in the form of a voltage. Thus for instance if one transmitter gives a voltage $U_1$ proportional to the useful power of a circuit and a second apparatus gives a voltage $U_2$ proportional to the wattless power of the same circuit these two voltages can be used to produce torques proportional to $U^2_1$ and $U^2_2$ and we then have $$U^2_1+U^2_2 = (UI \cos \varphi)^2 + (UI \sin \varphi)^2 = U^2 I^2$$

in other words a measure of the apparent power of the circuit can be obtained.

In a similar manner if a voltage $U_1$ be applied to one winding of the counteracting electro-magnet and if $U_1$ be proportional to the apparent power of the circuit $UI$, then if a torque $C$ proportional to the useful power be exerted on the disc the voltage $U_2$ given by the rotatable arm of the rheostat and which is to be applied to the second winding of the counteracting electro-magnet is such that $$C = U_1 U_2$$

or $$k_1 UI \cos \varphi = k_2 UI . U_2$$

$$U_2 = \frac{k_1}{k_2} \cos \phi$$

i. e. the voltage $U_2$ transmitted is a measure of the power factor of the circuit.

The above devices show how it is possible to totalize the powers of several factories individually connected to the receiving station by the transmission lines. The devices described cannot however be used if the factories are not connected direct to the receiving station but are strung out as indicated of the circular rheostats 7, 8, 9 . . . then the torques produced by these electro-magnets will be proportional to:

$$\frac{1}{T}\int_0^T u_1(u_1+u_2+ \ldots u_n)dt = kP_1$$

$$\frac{1}{T}\int_0^T u_2(u_1+u_2+ \ldots u_n)dt = kP_2$$

$$\overline{\frac{1}{T}\int_0^T u_n(u_1+u_2+ \ldots u_n)dt = kP_n}$$

$P_1 P_2 \ldots P_n$ being the various powers to be transmitted then adding like terms together we obtain in Fig. 6 in which A, B, C are factories the respective powers of which are $P_1, P_2,$ and $P_3$ and D the receiving station where the sum of the powers of the factories A, B and C is to be measured.

The wiring diagram of Fig. 5 above described can be utilized, but it is necessary to employ three connecting wires in order to connect together the auxiliary circuits of the transmitting apparatus.

The present invention relates to two devices enabling the powers of several factories to be totalized at the receiving station when only two wires are available for connecting together the transmitting apparatus located in different factories.

In one device a local voltage is made use of in each factory in the manner above described, the square of whose magnitude is proportional to the power of the factory, and an auxiliary transmitting apparatus is placed in each factory, save in the one furthest from the receiving station, having a main torque produced by two voltage electro-magnets respectively fed from the local voltage and from the voltage which is transmitted by the most neighbouring factory located in the direction away from the receiving station. From each factory a potential difference is transmitted to the next following one which is the local voltage for the factory furthest from the receiving station and the voltage applied to the counteracting electro-magnet of the auxiliary transmitting apparatus to the other factories.

Hence in the case of Fig. 6, auxiliary transmitting apparatus will be located in the factories B and C.

Fig. 7 shows diagrammatically one of the circuit arrangements which can be employed for putting the device into practice, only the auxiliary transmitters and the connections to which they lead have been shown. The power transmitters, which are not shown, are wired to the circuits and connected together in each factory in the manner as has been already described. They supply in each factory local potential differences $U_1$, $U_2$, $U_3$ which are respectively applied to the terminals $a$ $b$ of the factories A, B and C.

A potential difference $U_1$ is transmitted from the factory A to the factory B in the manner above-described given by the equation:

$$U^2_1 = kP_1 \quad (1)$$

$P_1$ being the power of the factory A and $k$ a constant.

Hence at the factory B a voltage $U_1$ is available and also a voltage $U_2$ given by the equation:

$$U^2_2 = kP_2 \quad (2)$$

$P_2$ being the power of the factory B and $k$ the same constant as above.

At the station B the intermediate transmitter of identical construction to the one which has been previously described includes a disc I which is subjected to the action of:

1. An electro-magnet 2—3 comprising two windings connected in parallel and fed by the potential difference $U_1$ derived from the factory A.

2. An electro-magnet 4—5 connected in similar manner to the local voltage $U_2$ and adding its torque to that of the preceding ones.

3. An electro-magnet 6—7 providing a torque acting in the opposite direction to that of the two preceding torques, and having a voltage $U$ at its terminals which can be automatically controlled by the movable arm $M$ of the rheostat $Rh$.

When the disc of the intermediate transmitter is stationary:

$$U^2_1 + U^2_2 = KU^2 \quad (3)$$

and hence $$KU^2 = k(P_1 + P_2) \quad (4)$$

The potential difference $U$ is transmitted from the factory B to the factory C where a local voltage $U_3$ is likewise available such that:

$$U^2_3 = kP_3 \quad (5)$$

At the factory C an intermediate transmitter similar to that of the factory B, has a disc 8 acted upon by three electro-magnets: 9—10 fed by the voltage $U$ derived from the factory B, 11—12 fed by the voltage $U_3$ derived from the power transmitters of the factory C and adding its torque to that of the preceding one, 13—14 supplying a counteracting torque to that of the preceding ones and subjected to a potential difference $U'$ which can be automatically controlled by the movable arm of the rheostat.

By suitably proportioning the action of the electro-magnets 9—10 and 11—12 matters may be arranged so that:

$$KU^2 + U^2_3 = K'U'^2 \quad (6)$$

and from Equations (4) and (5) it follows that:

$$K'U'^2 = k(P_1 + P_2 + P_3) \quad (7)$$

It is hence only necessary to apply the potential difference $U'$ to the apparatus located at the receiving station in the manner previously pointed out, in order to measure the sum of the powers of the factories A, B and C at the receiving station.

The device can be applied whatever the number of factories may be. Likewise transformers may be utilized enabling the most suitable values to be given to the various voltages employed.

An alternative device has the advantage of not requiring an auxiliary transmitter and consists in separately feeding the two windings of the counter-acting electro-magnet of each transmitting apparatus, by applying to one of the windings the variable voltage obtained from the rheostat of the apparatus and by applying to the other the sum of the variable voltages supplied by the factory transmitters increased by twice the voltage transmitted from the immediately neighbouring factory located in the direction away from the receiving station. From each factory the preceding voltage summation is transmitted to the following station starting from the station furthest from the receiving station, but to which summation only the voltage transmitted by the neighbouring factory has been added.

Fig. 8 shows diagrammatically one of the circuit arrangements which can be utilized for putting this device in practice. In order to make the description clear, it has been assumed that each factory comprises only a single transmitter and that consequently there is no need to sum up a total in each of them. The transmitting apparatus are not shown, but it need only be said that the terminals $a$, $b$ have to be connected to the winding of the counteracting electro-magnet, which is connected on the one hand to one end of the rheostat and on the other hand to the variable tapping of the rheostat of the transmitting apparatus, and that the terminals $c$ and $d$ have to be connected to the other winding of the counteracting electro-magnet.

At the station A (Fig. 8), which is furthest from the receiving station, it is only necessary to connect in parallel the two windings of the counteracting electro-magnet of the transmitting apparatus. If $u_1$ is the instantaneous value of the variable voltage obtained from the rheostat of the apparatus, $P_1$ the power of the factory A and $K$ a constant, when the torques acting on the transmitting apparatus balance $$\frac{1}{T}\int_0^T u^2_1 dt = KP_1 \quad (8)$$

The voltage $u_1$ is transmitted from the factory A to the factory B.

At the factory B, the winding $a, b$ is fed by the variable voltage $u_2$ supplied by the rheostat of the transmitting apparatus and the other winding $c, d$ is subjected to a voltage proportional to the sum $(u_2+2u_1)$ obtained by means of the small transformers 15 and 16.

If $P_2$ is the power of the factory B, $k_2$ and $k'_2$ are constants:

$$k_2 \frac{1}{T}\int_0^T u_2(u_2+2u_1)dt = k'_2 P_2 \quad (9)$$

if $$\frac{k'_2}{k_2} = K$$

then:

$$\frac{1}{T}\int_0^T u_2(u_2+2u_1)dt = KP_2 \quad (10)$$

A voltage proportional to the sum $(u_2+u_1)$ is transmitted from the factory B to the factory C.

In order to obtain this voltage, an additional tapping is taken off the secondary of the transformer 15 of the factory A.

At the factory C, the winding $a, b$ is fed by the variable voltage $u_3$ supplied by the rheostat of the transmitting apparatus, and the other winding $c, d$ has a voltage applied to it which is proportional to the sum $(u_3+2u_1+2u_2)$ and which is obtained by means of the transformers 17 and 18.

If $P_3$ is the power of the factory C, $k_3$ and $k'_3$ are constants then:

$$k_3\frac{1}{T}\int_0^T u_3(u_3+2u_1+2u_2)dt = k'_3 P_3 \quad (11)$$

if $$\frac{k'_3}{k_3} = K$$

then:

$$\frac{1}{T}\int_0^T u_3(u_3+2u_1+2u_2)dt = KP_3 \quad (12)$$

From the factory C, a voltage proportional to the sum $(u_1+u_2+u_3)$ is transmitted to the following station, this voltage being obtained by taking an additional tapping off the secondary of the transformer 17 of the factory C. If the receiving station is the next following one, by applying to the receiving apparatus the voltage summation $(u_1+u_2+u_3)$ in the manner previously indicated, the summation of the powers of the factories A, B and C can be measured at this receiving station. By adding like terms together in the Equations (8), (10) and (12) we obtain:

$$\frac{1}{T}\int_0^T (u_1+u_2+u_3)^2 dt = K(P_1+P_2+P_3) \quad (13)$$

The circuit arrangement which has been described is only one of several for carrying the invention into effect and as may be conceived other circuit arrangements can exist based on the same principle. More especially the summation of the voltages may be obtained by means of autotransformers.

The device is likewise applicable if the power of each factory represents the summation of the powers of several circuits.

One method consists in considering independently all the transmitting apparatus whether they appertain to the same factory or to different factories and in applying the device which is suitable whatever the number of the terms to be totalized may be.

Another method consists in utilizing in each factory the circuit arrangements previously indicated whose object is to totalize several local powers.

Fig. 9 shows a circuit arrangement based on this principle and enabling the values of the powers of three factories A, B and C to be totalized. In this diagram it has been assumed that there are two circuits at station A, four circuits at station B and three circuits at station C. The circuit arrangement at station A presents no novel features; by means of transformers 19 and 20 a potential difference $u_1$ is obtained which is the sum of the partial potential differences produced by the various transmitters and such that:

$$\frac{1}{T}\int_0^T u^2_1 dt = KP_1 \quad (14)$$

$P_1$ representing the total power of the factory A and $K$ a constant.

At the stations B and C, transformers 21 and 26 are respectively inserted in the totalizing circuits and are fed from the secondary windings, and the operation is reduced to that previously described, by considering the voltages $u_2$ and $u_3$ as being respectively the sum of the partial voltages of all the transmitting apparatus of the factories B and C.

Naturally all the devices which are described in the present application may be applied for totalizing any units other than power.

I claim:

1. Apparatus for relaying to a receiving station a voltage proportional to the square root of the sum of the powers of circuits located at a plurality of stations comprising in combination means for obtaining at the station furthest from said receiving station a voltage proportional to the square root of the power of said station, lines for transmitting said voltage to the next station in line, a rotatable disc at said second station, an electro-magnet at the second station, a double winding on said electro-magnet connected in parallel across said transmitted voltage, means for exerting a torque on said disc proportional to the power of said second station and adding itself to the torque produced by said electro-magnet, a source of auxiliary voltage whose value is controlled by the rotation of said disc, a counteracting electro-magnet to which said voltage is applied and which exerts a counter-balancing torque on said disc, lines connecting said counteracting electro-magnet to a third station to which the voltage applied to said counteracting electro-magnet, and which is proportional to the square root of the sum of the powers of the first two stations, is transmitted, identical apparatus at said third station as at said second station, wires connecting said third station to a fourth station along which a voltage proportional to the square root of the sum of the powers of said first three stations is transmitted, wires connecting the remaining stations so that by cumulative effect a voltage is obtained at said receiving station proportional to the square root of the sum of the powers of all said stations.

2. Apparatus for relaying to a receiving station a voltage proportional to the square root of the sum of the powers of circuits located at a plurality of stations, comprising in combination means for obtaining at the station furthest from said receiving station a voltage proportional to the square root of the power of said furthest station, a rotatable disc at a second station next to said furthest station, means for exerting on said disc a driving torque proportional to the power of said second station, an auxiliary source of voltage at said second station, whose value is controlled by said rotatable disc, an electro-magnet at said second station, a winding on said electro-magnet connected across said transmitted voltage, a second winding on said electro-magnet, a transformer fed by said transmitted voltage, a second transformer fed by said controlled auxiliary voltage, said transformers being connected to said second winding of said electro-magnet in such manner that said two electro-magnet windings exert on said disc a torque balancing said driving torque and so that the square of the sum of the transmitted and auxiliary voltages are proportional to the sum of the powers of said two stations, wires for relaying the sum of said transmitted and auxiliary voltages to a third station, identical apparatus at said third station as at said second station, wires connecting said third station to a fourth station along which a voltage proportional to the square root of the sum of the powers of said first three stations is transmitted, wires connecting the remaining stations so that by cumulative effect a voltage is obtained at said receiving station proportional to the square root of the sum of the powers of all said stations.

3. In an electrical system for totalizing at a receiving station electrical quantities from a plurality of scattered stations, the combination of a pair of current distributors connecting all said stations in series, a rotatable element at each of said stations, wattmeter coils for exerting on said rotatable element a torque functional of an electrical quantity of the station concerned, coils whose ampere-turns are varied by the rotation of said element for exerting a controlling torque thereon, and circuit arrangements at each station for obtaining from said torque producing system an electrical quantity proportional to the sum of electrical quantities of that station and all the preceding ones, said circuit arrangements impressing said electrical quantity on said current distributors for transmission to the torque producing system of the next succeeding station.

4. In an electrical system for totalizing at a receiving station electrical power from a plurality of scattered stations, the combination of a pair of current distributors connecting all said stations in series, a rotatable element at each of said stations, wattmeter coils for exerting on said rotatable element a torque proportional to the electrical power of the station concerned, coils whose ampere-turns are varied by the rotation of said element for exerting a controlling torque thereon, and circuit arrangements at each station for obtaining from said torque producing system a voltage functional of the sum of the electrical powers of that station and all the preceding ones, said circuit arrangements impressing said voltage on said current distributors for transmission to the torque producing system of the next succeeding station.

5. In an electrical system for totalizing at a receiving station electrical powers from a plurality of scattered stations, the combination of a pair of current distributors connecting all said stations in series, a rotatable element at each of said stations, wattmeter coils for exerting on said rotatable element a torque proportional to the electrical power of the station concerned, a rheostat at each station, a source of electrical energy for impressing voltage on said rheostat, means controlled by the rotation of said element for tapping voltage from said rheostat, counteracting coils for exerting a controlling torque on said element functional of the voltage tapped from said rheostat, and circuit arrangements at each station for obtaining from said torque producing system a voltage functional of the sum of the electrical powers of that station and all the preceding ones, said circuit arrangements impressing said voltage on said current distributors for transmission to the torque producing system of the next succeeding station.

6. In an electrical system for totalizing at a receiving station electrical powers from a plurality of scattered stations, the combination of a pair of current distributors connecting all said stations in series, a rotatable element at each of said stations, wattmeter coils for exerting on said rotatable element a torque proportional to the electrical power of the station concerned, a second set of coils for exerting on said rotatable element a torque proportional to the sum of the powers of all the preceding stations and of the same sign as the first mentioned torque, a rheostat at each station, a source of electrical energy for impressing voltage on said rheostat, means controlled by the rotation of said element for taking tappings from said rheostat, and a third set of coils connected across the variable tapping of said rheostat for exerting a controlling torque on said element, said controlling coils of each station being connected by said current distributors to said aforementioned second set of coils of the next succeeding station.

7. In an electrical system for totalizing at a receiving station electrical power from a plurality of scattered stations, the combination of a pair of current distributors connecting all stations in series, a rotatable element at each of said stations, wattmeter coils for exerting on said rotatable element a torque proportional to the electrical power of the station concerned, a rheostat at each station, a source of electrical energy for impressing voltage on said rheostat, means controlled by the rotation of said element for tapping voltage from said rheostat, a second set of coils for producing on said rotatable element a controlling torque equal to the product of the voltage tapped from said rheostat and twice the sum of the tapped rheostat voltages of all the preceding stations, and transformers including tapping devices at each station for transmitting to the next station the sum of the tapped rheostat voltages of all the preceding stations.

ROGER DUBUSC.